United States Patent [19]

Nettro

[11] 4,406,401

[45] Sep. 27, 1983

[54] WATER TEMPERATURE CONTROL SYSTEM FOR A WASHING MACHINE

[75] Inventor: Ronald L. Nettro, Fern Creek, Ky.

[73] Assignee: General Electric Company, Louisville, Ky.

[21] Appl. No.: 271,326

[22] Filed: Jun. 8, 1981

Related U.S. Application Data

[63] Continuation of Ser. No. 108,628, Dec. 3, 1979, abandoned.

[51] Int. Cl.$^3$ .................... G05D 23/00; D06F 33/00
[52] U.S. Cl. .................. 236/12.12; 236/12.15; 68/12 R
[58] Field of Search .............. 236/12 R, 12 A, 12 AB, 236/12; 68/12 R; 137/3–6, 88, 91–93; 364/502, 509, 557

[56] References Cited

U.S. PATENT DOCUMENTS

| | | | |
|---|---|---|---|
| 2,533,624 | 12/1950 | Ray | 236/12 |
| 3,229,077 | 1/1966 | Gross | 364/502 X |
| 3,383,037 | 5/1968 | Vince | 236/12 |
| 3,434,488 | 3/1969 | Talbot | 137/90 |
| 3,707,856 | 1/1973 | Niewyk et al. | 68/12 R |
| 3,772,900 | 11/1973 | Hopkins | 68/12 R |
| 3,987,808 | 10/1976 | Carbonell et al. | 137/3 |
| 4,004,884 | 1/1977 | Zdrodowski | 23/259 |
| 4,031,911 | 6/1977 | Frazar | 137/3 |

Primary Examiner—Albert J. Makay
Assistant Examiner—Harry Tanner
Attorney, Agent, or Firm—H. Neil Houser; Radford M. Reams

[57] ABSTRACT

A microprocessor controlled water temperature control system for a washing machine, such as a clothes or dish washer, is disclosed. Average water fill temperature is calculated periodically and, with one water valve maintained in an on condition, the other water valve is cycled for a percentage on time as calculated by the microprocessor which is required to produce an actual water fill temperature equal to the desired water temperature selected by the user. The single water valve is cycled on and off repetitively over a predetermined cycle time period with the percentage on time being recalculated for each cycle so that the system is capable of adapting to changing inlet water temperatures.

4 Claims, 2 Drawing Figures

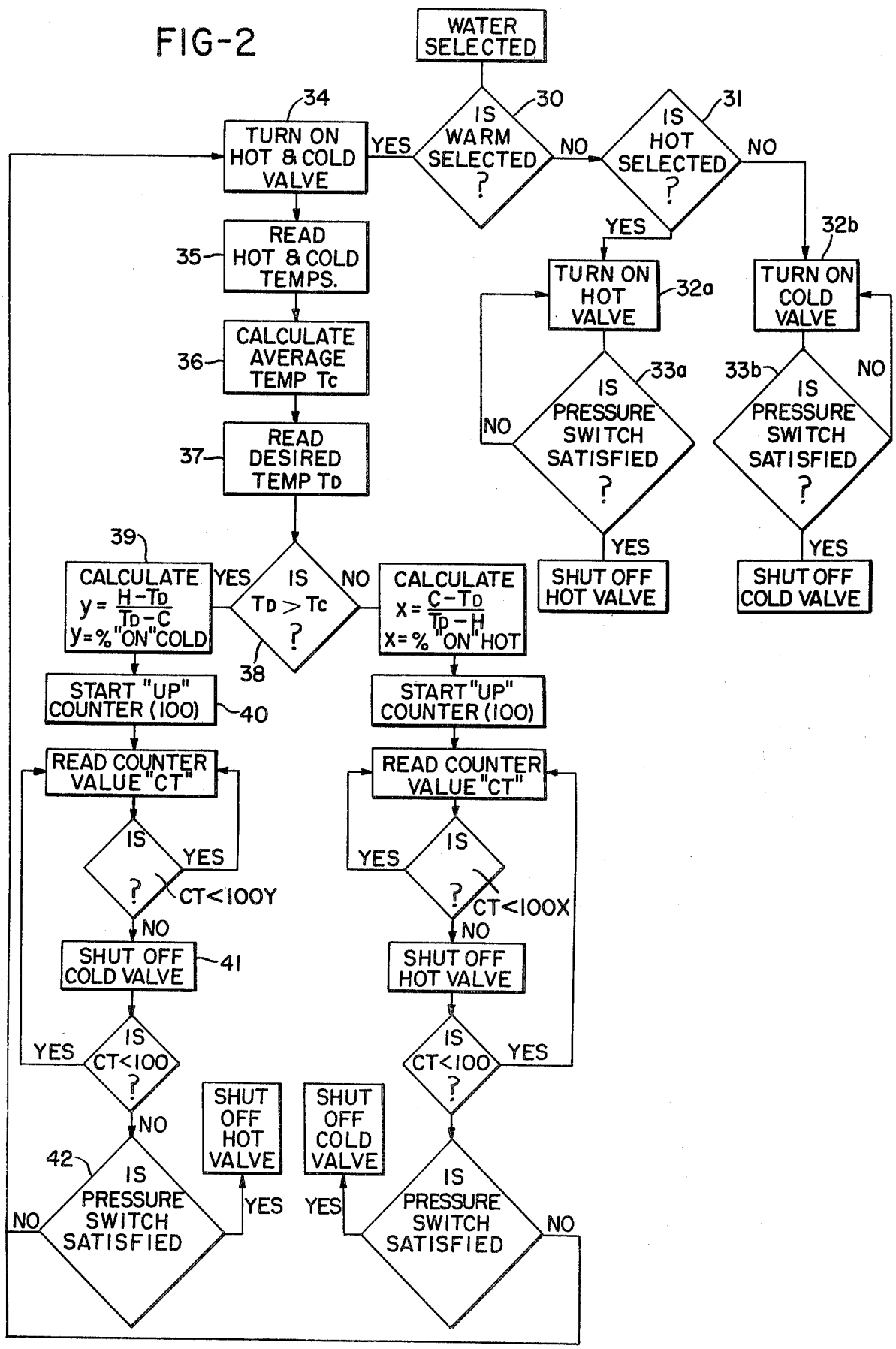

WATER TEMPERATURE CONTROL SYSTEM FOR A WASHING MACHINE

This is a continuation of application Ser. No. 108,628, filed Dec. 3, 1979, now abandoned.

BACKGROUND OF THE INVENTION

This invention relates to washing machines and, more particularly, to automatic washing machines that have a system for controlling the temperature of fill water introduced into the washing machine tub.

Systems for providing selectable water fill temperatures in, for example, clothes washers are well known. Sophisticated and expensive systems employing temperature sensors and modulated valves have been employed while more economical systems that merely turn on one or both water valves to achieve hot, cold or warm selection have also been employed. There is, however, still a need for an accurate low cost means for controlling fill water temperature. This is particularly true in the case of clothes washers with the popularity of synthetic fabrics that are sensitive to the water temperatures employed. Similar considerations apply in the case of dishwashing machines where, for example, energy conservation is of serious concern. Therefore while the invention will be described in the context of a clothes washing machine, it will be appreciated that it is equally applicable to other water fill washing machines, such as a dishwasher.

It is, therefore, an object of the present invention to provide a water temperature control system for water fill washing machines that allows the selection of a desired water temperature from a multiplicity of available settings and does so in a low cost and accurate manner.

SUMMARY OF THE INVENTION

Thus, in accordance with the invention, there is provided a water temperature control system for a washing machine which comprises, in part, hot and cold incoming water valve means, including means for independently controlling the on/off condition of each of the valve means to supply fill water to the washing machine tub. The system also comprises means for independently sensing the temperature of the incoming hot and cold water and user-operated means for establishing a desired temperature value for the fill water. The system further includes microprocessor means for generating a series of control instructions initially to turn both valve means on at the beginning of the fill cycle and subsequently being responsive to the sensed incoming water temperatures to repetitively cycle one of the water valves on and off as required to cause the actual fill water temperature to be equal to the desired fill water temperature. The system finally includes means responsive to the control instructions to actuate the water valve control means in accordance thereto to achieve the desired fill water temperature.

BRIEF DESCRIPTION OF THE DRAWINGS

FIG. 2 is a program flow chart used in connection with the control system of FIG. 1.

DESCRIPTION OF THE PREFERRED EMBODIMENT

Figure 1:
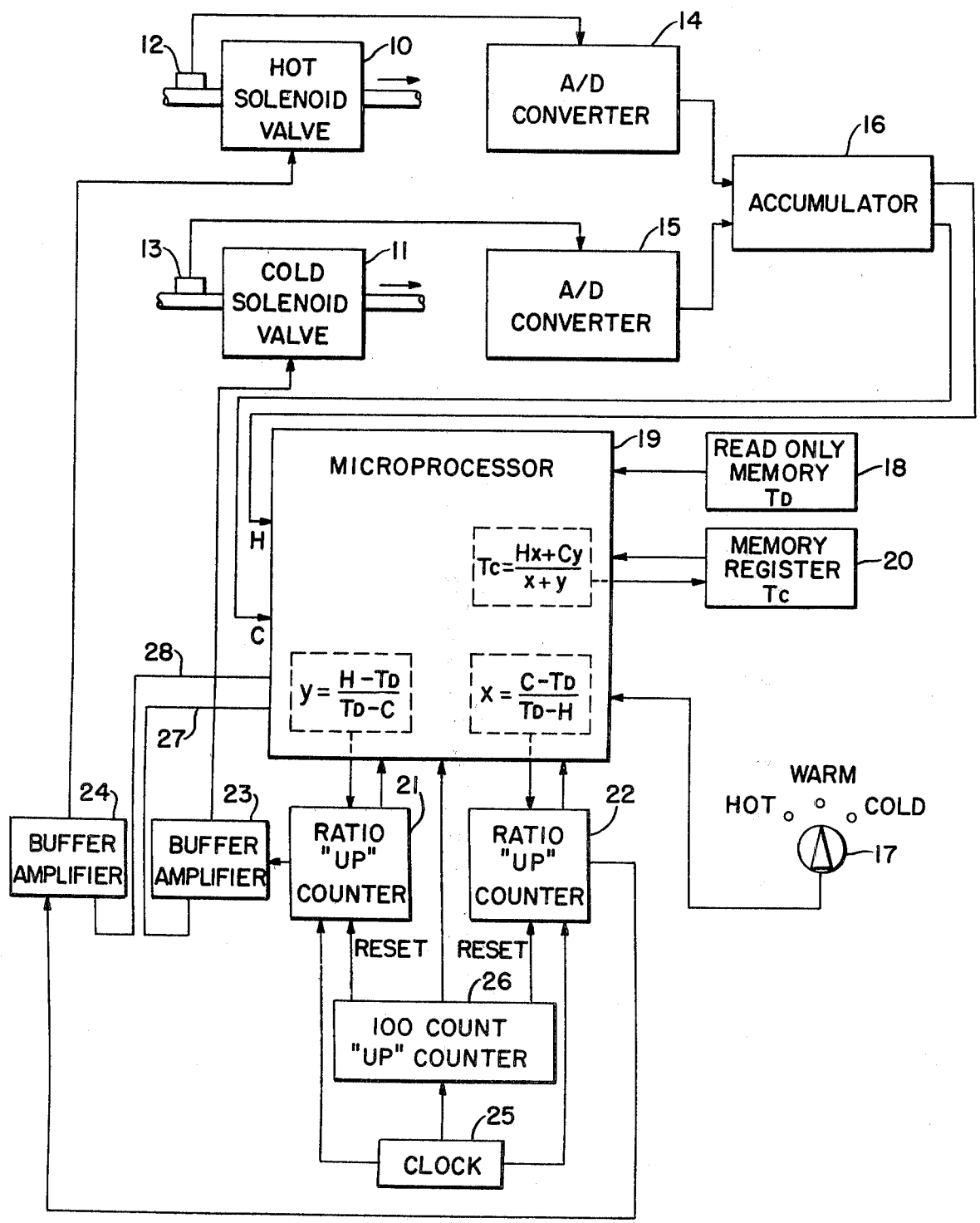
FIG. 1 is a schematic of a water temperature control system embodying the principles of the present invention.

Referring now to FIG. 1, conventional hot and cold incoming water solenoid valves 10 and 11 of, for example, a clothes washer are coupled to the water supply lines in suitable manner. Each valve is provided with a solenoid arrangement to control the on/off condition of the valve. Means including thermistors 12 and 13 are provided for independently sensing the temperature of the incoming hot and cold water. Preferably, thermistors 12, 13 are located so as to sense the water temperature on the upstream side of the water valves so that the incoming water temperature can be sensed irrespective of the on/off condition of the water valves. The outputs of thermistors 12, 13 are coupled to A/D converters 14 and 15 which operate in conventional manner to convert the analog outputs of the thermistors to digital pulse signals which are stored temporarily in accumulator 16.

Selector switch 17, which may be mounted on the control panel of the washing machine, comprises user-operated means for establishing a desired temperature for the fill water in the washing machine tub. As shown in FIG. 1, three selections are possible, however, it will be appreciated that a variety of selections may be provided depending on the degree of sophistication to which the system is to perform. Thus, a plurality of actual temperature value selections may be stored in a read only memory 18 which may be included as part of microprocessor 19.

Microprocessor 19 may be any of a variety of well known microprocessor units, including an arithmetic logic unit, timing and control circuits and input and output latches or gates, the operation of which are well known to the microcomputer art. Microprocessor 19 may also include a random access memory register 20 for temporary storage of data required in the course of the operation of the microprocessor. Microprocessor 19 is preprogrammed to generate control instructions initially directing that both of the incoming water valve means be turned on at the beginning of the fill cycle. The program then operates in response to the sensed incoming water temperature information temporarily stored in accumulator 16 to cause repetitive cycling of one of the water valves, on and off, as required to cause the actual fill water temperature to be equal to the desired fill water temperature.

The water temperature control system of the invention is further provided with means including ratio "up" counters 21 and 22 and buffer amplifier circuits 23, 24 which comprise means responsive to the control instructions from microprocessor 19 to effect actuation of the water valve control means in accordance with the control instructions to achieve the desired fill water temperature. A clock circuit 25 provides a pulse train for advancing the counters. Counter 26 is included to establish the fundamental period for the cycling of the water valves.

The operation of the control system of FIG. 1 will be described in connection with the program flow chart illustrated in FIG. 2 based on which an operative water control program may be readily constructed by anyone skilled in the art for microprocessor 19. Thus, at the beginning of the water fill cycle, the program may, for example, enter an initial inquiry 30 to determine whether a warm water setting has been selected. If the answer is no, thus indicating for the embodiment of FIG. 1 that either an extreme hot or cold water setting has been selected, the program enters one or the other of the appropriate decision paths via inquiry 31 to turn on the appropriate water valve in accordance with instruction 32a or 32b and to keep it on until the tub has reached the selected water fill level as determined by inquiry 33a or 33b. This operation is shown diagrammatically in FIG. 1 as being performed via output lines 27 and 28 to buffer amplifier 23 and 24 which in turn suitably operate the appropriate selected water valve.

Assuming that the warm water setting has been selected, instruction 34 directs that both hot and cold water valves be turned on following which instruction 35 causes the stored sensed temperature readings to be transferred in from accumulator 16 for the purpose of calculating, in accordance with instruction 36, the average temperature value of the fill water. Assuming approximately equal flow rates through each of the valves, the calculated average fill water temperature, $T_C$, is determined by the relationship:

$$T_C = (Hx + Cy)/(x+y) \quad \text{(Eq. 1)}$$

where H and C are the sensed temperatures of the hot and cold incoming water, respectively, and x and y are the percentage "on" times of the hot and cold water valves, respectively. Next, instruction 37 causes the desired temprature setting, $T_D$ to be read in from memory 18 and compared to the calculated average temperature setting, $T_D$. The program then determines at inquiry 38 whether the desired temperature is higher than the calculated temperature for the incoming water combination. Assuming it is, which would most likely be the case at the beginning of the fill cycle since standing water in the hot water line is likely to be at room temperature, the program moves to instruction 39 wherein a percentage of "on" time for the cold water valve is determined in accordance with the relationship derived from Eq. 1;

$$y = (H - T_D)/(T_D - C) \quad \text{(Eq. 2)}$$

wherein $T_D$ is substituted for $T_C$ and x is set equal to 1. Instruction 40 of the program then causes the "up" counter 21 to begin counting which continues until the count, CT, in the counter 21 is equal to the percentage of "on" time just calculated (multiplied by a factor of 100 to convert the percentage figure to an integral number for comparative purposes), at which time the cold water valve is shut off by instruction 41 and remains off until the end of the fundamental cycling period is reached as determined by the 100 count of "up" counter 26. When this point is reached, the program determines by inquiry 42 whether the desired water level has been reached in the tub. Assuming it has not, the program recycles back to the beginning which causes the cold water valve to be turned on and remains on for the duration of the percentage "on" time period "y" as previously described. In this way, the effective flow rate of the cold water inlet is reduced by reducing the "on" time of the cold water valve so that the calculated mix temperature will correspond to the desired fill water temperature. It will be appreciated that each time the program cycles through the water valve cycle, the value of the percentage "on" time "y" can be changed depending on the sensed temperature conditions of the input water.

It will be readily apparent that if the results of inquiry 38 is a determination that the incoming water is higher, i.e. hotter, than the desired temperature, the right hand branch of the program will be entered into to cause cycling of the hot water valve in the same manner as was performed with respect to the cold water valve. Thus, at all times during the water fill cycle, the system is able to adapt to changing water temperatures which may cause the fill water entering the wash tub to rise above or below the desired temperature value.

The program has been described in connection with only a warm water temperature control although it will be appreciated that both hot and cold water fill temperatures may also be controlled by eliminating the first inquiry in the program such that the desired temperature $T_D$ used in the calculations may be any one of the temperature values stored in the read only memory of microprocessor 19 by suitable selection with control 17.

It will be apparent that there has been described what is at present considered to be a preferred embodiment of the invention which provides flexible and effective water temperature control for a clothes washing machine. This system may be modified readily to adapt to any desired set of water temperature levels by a simple substitution of temperature levels in the microprocessor memory. It will be obvious to those skilled in the art that various changes and modifications may be made in the invention as described herein without departing from the invention. It is, therefore, intended by the appended claims to cover all such changes and modifications as fall within the true spirit and scope of the invention.

What is claimed is:

1. A water temperature control system for a washing machine comprising:
    (a) hot and cold incoming water valve means including means for independently controlling the on/off condition of said hot and cold incoming water valve means, respectively, to supply fill water to the washing machine tub;
    (b) means for independently sensing the temperatures of incoming hot and cold water, respectively;
    (c) user-operated means for establishing a desired temperature, $T_D$, for the fill water;
    (d) microprocessor means for generating water valve control instructions, said control instructions initially directing that both of said valve means be turned on at the beginning of a fill cycle and subsequently directing that either one of said water valve means be repetitively cycled on and off in response to only the sensed incoming water temperatures and the temperature established by said user-operated means so as to cause the actual fill water temperature to be substantially equal to the desired fill water temperature; and
    (e) means connected to said microprocessor means and responsive to said valve control instructions to actuate said water valve means in accordance with said instructions to achieve the desired fill water temperature.

2. The water temperature control system of claim 1 wherein said temperature sensing means are located to sense the temperature of the incoming hot and cold water upstream of said hot and cold incoming water valve means, respectively.

3. The water temperature control system of claim 1 wherein said microprocessor means comprises:

means responsive to said temperature sensing means for repetitively calculating the average fill temperature, $T_C$;

means for comparing $T_C$ to the desired temperature, $T_D$, established by said user-operated means; and means for calculating the desired percentage ON times X and Y for said hot and cold water valves, respectively, in accordance with the following relationships:

if $T_C \geq T_D$ then $X=(C-T_D)/(ti\ T_C-H)$ and $Y=1$;

if $T_C < T_D$ then $Y=(H-T_D)/(T_D-C)$ and $X=1$;

where H and C are the sensed hot and cold incoming water temperatures, respectively;

and wherein said microprocessor means generates said water valve control instructions directing said either one of said water valve means to be repetitively cycled on and off in accordance with said desired percentage ON times.

4. The water temperature control system of claim 3 wherein said means for calculating the average fill temperature $T_C$, calculates $T_C$ in accordance with the following relationship:

$$T_C=[(H\times X)+(C\times Y)]/(X+Y).$$

* * * * *

UNITED STATES PATENT AND TRADEMARK OFFICE
CERTIFICATE OF CORRECTION

PATENT NO. : 4,406,401
DATED : September 27, 1983
INVENTOR(S) : Ronald L. Nettro It is certified that error appears in the above-identified patent and that said Letters Patent is hereby corrected as shown below:

In the Claims:

Column 5, line 10, "if $T_C \geq T_D$ then $X = (C - T_D)/(tiT_C - H)$ and $Y = 1;$" should read --if $T_C \geq T_D$ then $X = (C - T_D)/(T_C - H)$ and $Y = 1;$--

Signed and Sealed this

Twentieth Day of March 1984

[SEAL]

Attest:

GERALD J. MOSSINGHOFF

Attesting Officer

Commissioner of Patents and Trademarks